United States Patent [19]

Jorgensen et al.

[11] Patent Number: 5,132,602
[45] Date of Patent: Jul. 21, 1992

[54] ACTUATOR POSITIONING APPARATUS

[75] Inventors: Gary C. Jorgensen; Michael D. Harper, both of Phoenix, Ariz.

[73] Assignee: Calsonic International, Inc., Irvine, Calif.

[21] Appl. No.: 594,859

[22] Filed: Oct. 2, 1990

[51] Int. Cl.$^5$ .............................................. G05B 1/02
[52] U.S. Cl. ..................................... 318/608; 318/439; 318/490; 318/565; 318/533
[58] Field of Search ............... 318/600, 601, 602, 603, 318/640, 671, 608, 439, 490, 565, 533

[56] References Cited

U.S. PATENT DOCUMENTS

| | | | |
|---|---|---|---|
| 3,742,328 | 6/1973 | Ohta | 318/685 |
| 3,846,688 | 11/1974 | Perloff | 318/490 |
| 4,291,262 | 9/1981 | Nakajima | 318/603 |
| 4,347,469 | 8/1982 | Dinger | 318/533 |
| 4,353,019 | 10/1982 | Sweeney, Jr. | 318/594 |
| 4,406,322 | 9/1983 | Rossi et al. | 165/14 |
| 4,485,863 | 12/1984 | Yoshida et al. | 165/42 |
| 4,514,670 | 4/1985 | Fassel et al. | |
| 4,684,858 | 8/1987 | Ma et al. | |
| 4,751,441 | 6/1988 | Lewis | 318/439 |
| 4,812,726 | 3/1989 | Benii et al. | 318/640 |
| 4,840,308 | 6/1989 | Akabane et al. | 236/13 |
| 4,855,657 | 8/1989 | Isobe et al. | 318/602 |
| 4,873,474 | 10/1989 | Johnson | 318/434 |
| 4,897,778 | 1/1990 | Miyamoto et al. | 364/174 |
| 4,924,166 | 5/1990 | Roussel | 318/608 |

FOREIGN PATENT DOCUMENTS 8511006 7/1985 France.

OTHER PUBLICATIONS

M. Birk "Unkonventionelle Drehzahlmessung" Elektronik; Dec. 14, 1984 pp. 71-72.

Primary Examiner—William M. Shoop, Jr.
Assistant Examiner—Saul M. Bergmann
Attorney, Agent, or Firm—Don J. Flickinger; Jordan M. Meschkow; Lowell W. Gresham

[57] ABSTRACT

A method and apparatus for accurately and reliably positioning an actuator arm (12) is disclosed. The actuator arm (12) is driven by a conventional DC motor (38). The conductors which supply current to the motor (38) serve as primary windings (60) of a current transformer (58). The signal induced on secondary windings (62) of the transformer (58) responds to fluctuations in average current flowing in the motor (38). These fluctuations are amplified (64) and filtered (66) so that an AC burst (68) is produced in response to each commutation of the motor (38). The AC burst (68) triggers a one-shot timing circuit (72), which generates a pulse that remains active until the AC burst (68) has decayed. The pulse disappears prior to a subsequent commutation of the motor (38). Thus, one pulse is generated for each commutation of motor (38). A counter (76) is clocked by these pulses. The counter (76) increments when the motor (38) moves in one direction and decrements when the motor (38) moves in the opposing direction. Thus, the counter (76) maintains a current count which describes the position of the motor (38). A controller (16) compares this current count with an input signal (14) and controls the operation of the motor (38) based on the results of the comparison. Accordingly, the motor (38) moves until the current count reaches a value corresponding to information presented in the input signal (14).

20 Claims, 2 Drawing Sheets

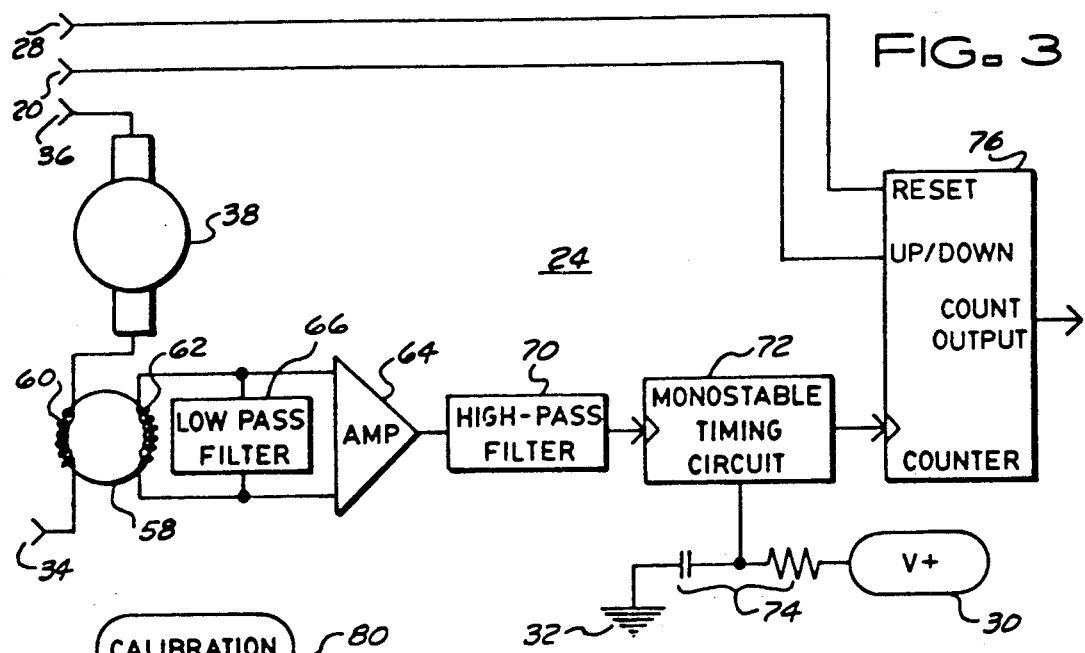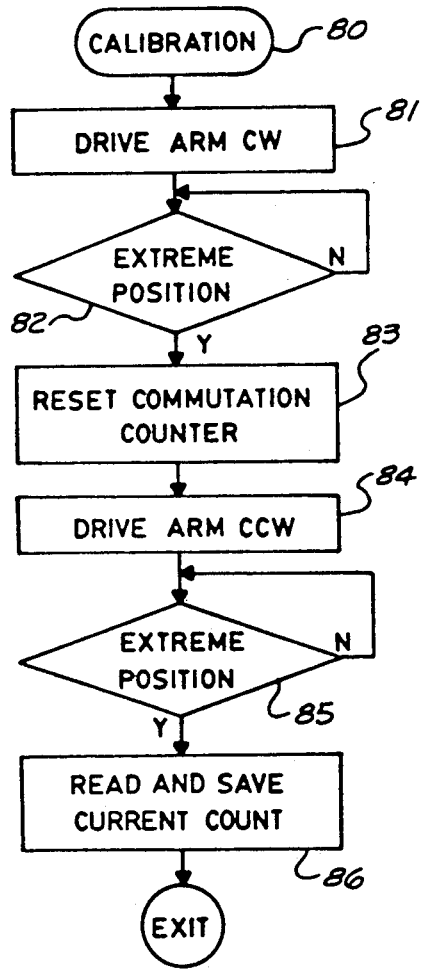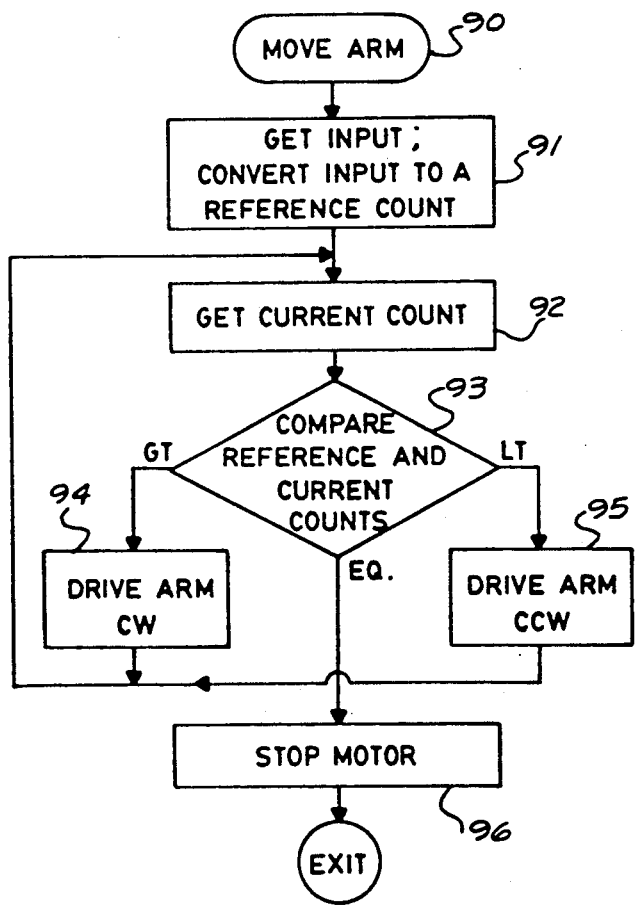

ACTUATOR POSITIONING APPARATUS

TECHNICAL FIELD OF THE INVENTION

The present invention relates generally to actuators which are driven by DC electrical motors. More specifically, the present invention relates to actuator positioning apparatuses which monitor motor commutations to obtain feedback for use in positioning an arm or other member.

BACKGROUND OF THE INVENTION

Actuators are mechanisms that move an arm or other member indirectly, rather than by hand. They find a wide variety of uses in connection with a wide variety of machines. Often, actuators must accurately position an arm or other mechanism at any requested location within the range of the actuator. One example of this requirement is in connection with an automotive heating, cooling, and ventilation system which positions a ventilation door or baffle so that hot and cold air flows are mixed together in such proportions that a desired temperature of ventilation air results.

In these applications, an actuator positioning apparatus typically obtains signals, data, or other information describing an arm's current position. The positioning apparatus may then utilize this information as an error signal that drives a feedback loop. Accordingly, an actuator is positioned by driving the arm until the error signal suggests that a desired position has been reached. However, the generation of accurate information to describe an arm's current position has posed numerous problems in prior art actuator positioning devices.

Specifically, one conventional technique uses a stationary balancing resistor having a movable wiper attached to an actuator arm. As the arm rotates or otherwise moves, the wiper moves over the resistor. Thus, a resistance changes with the position of the actuator arm, and an electrical signal with characteristics proportional to the arm's position is easily generated. This position determining technique has an advantage in that it is relatively inexpensive to implement. Unfortunately, the accuracy of this electrical signal is typically poor, and consequently actuator arm positioning accuracy is typically poor. The poor representation of actual position by the electrical signal is due, at least in part, to correspondingly poor tolerances which result from mechanically positioning an actuator arm, wiper, and resistor relative to one another.

In addition to poor accuracy, the balancing resistor technique suffers from poor reliability. Wear and the ravages of the environment, such as dust, temperature cycling, temperature extremes, moisture, and the like, further degrade the performance of this position determining technique. Thus, the poor accuracy demonstrated by this technique may be expected to become even worse over time.

Other conventional position determining techniques which improve on the accuracy and reliability of the balancing resistor technique are known. For example, various sophisticated optical and magnetic signaling and sensing devices may be coupled to an actuator arm or to a motor which drives an actuator arm to provide positioning information. In addition, more sophisticated motors, such as stepper motors, may be employed with and without feedback to achieve improved position accuracy or reliability. However, these more sophisticated techniques often achieve only marginal accuracy or reliability improvements while substantially increasing costs.

SUMMARY OF THE INVENTION

Accordingly, it is an advantage of the present invention that an improved actuator positioning apparatus and method are provided.

Another advantage of the present invention is that an actuator positioning apparatus and method are provided which utilize conventional DC motors.

Yet another advantage is that the present invention senses motor position, which directly relates to actuator position, without the use of moving components or without relying on mechanical cooperation between components.

Still another advantage is that the present invention counts naturally occurring commutations of current in a DC motor to determine motor position.

Another advantage is that the present invention achieves improved accuracy and reliability using inexpensive and reliable components.

The above and other advantages of the present invention are carried out in one form by an improved method of operating a DC motor to position an actuator arm or other member. The method receives a position signal which defines a desired position for the member. A DC voltage is applied to the motor to cause an average current to flow through the motor. However, the current fluctuates as a result of motor commutation. The method then senses these fluctuations from the average current. Occurrences of these current fluctuations are counted to maintain a current count, and this current count is compared with the position signal. The method removes the DC voltage from the motor when the comparison indicates that the member has substantially, reached the desired position.

The above and other advantages of the present invention are carried out in another form by an improved actuator apparatus which causes an actuator arm or other member to move to a desired position. The apparatus includes a device for selectively applying a DC voltage in response to a signal presented at the device's control input. A DC motor physically couples to the member and electrically couples to the DC voltage-applying device. When the DC voltage is applied to the motor, an average current flows through the motor. However, this current fluctuates as a result of motor commutation. The apparatus additionally includes a device for sensing these fluctuations and a counter for counting occurrences of the fluctuations. The counter maintains a current count. A feedback device then receives the current count and generates the signal input to the control input of the DC voltage-applying device to control application of the DC voltage to the motor in response to the current count.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

FIG. 3 shows a block diagram of a commutation counter portion of the present invention;

FIG. 4 shows a flow chart of a calibration procedure performed by the present invention; and FIG. 5 shows a flow chart of a position arm procedure performed by the present invention.

DETAILED DESCRIPTION OF THE PREFERRED EMBODIMENT

Figure 1:
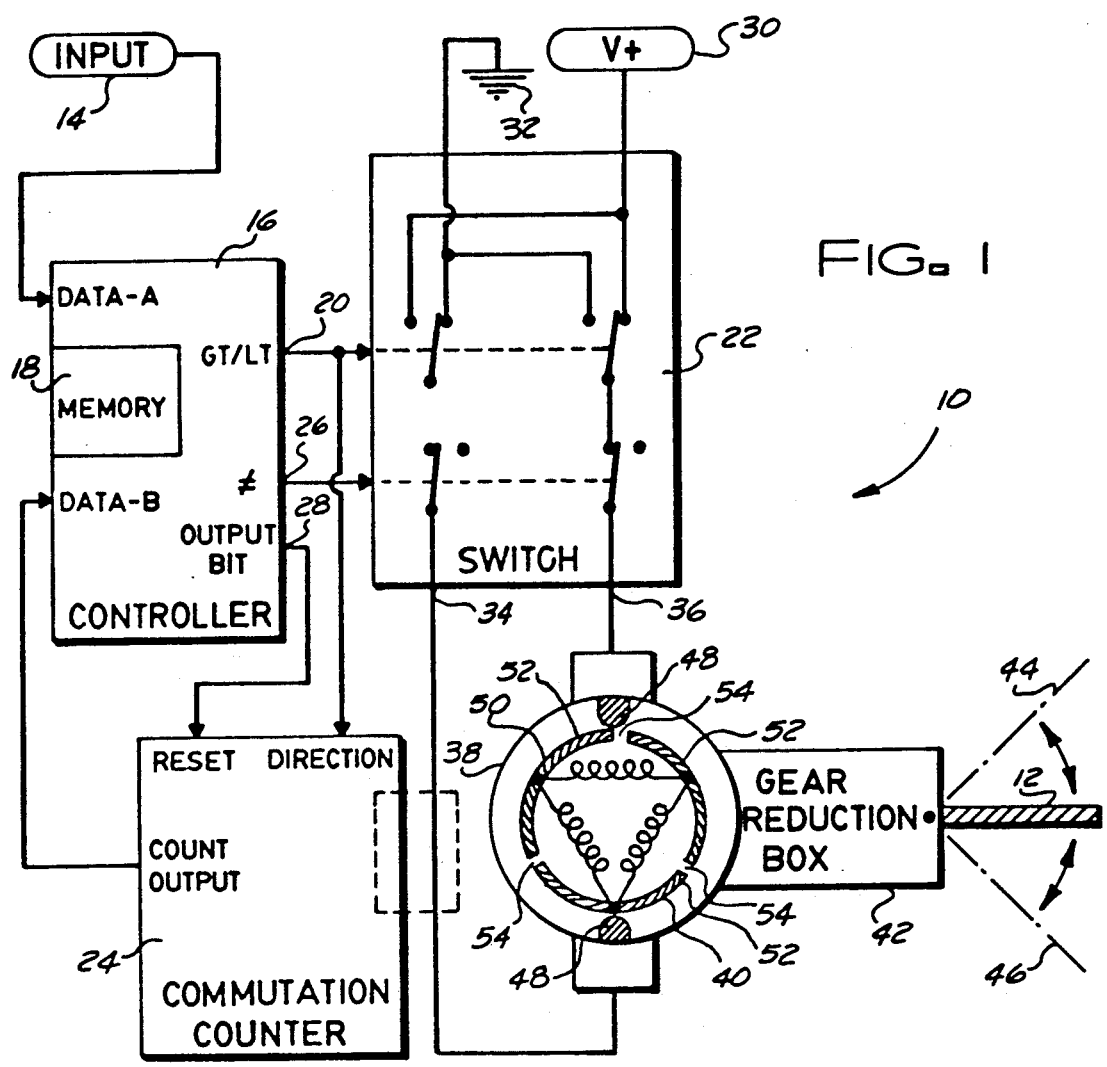
FIG. 1 shows a block diagram of an actuator constructed in accordance with the teaching of the present invention.

FIG. 1 shows a block diagram of an actuator 10 constructed in accordance with the teaching of the present invention. Actuator 10 positions an actuator arm 12 or other member or mechanism in accordance with instructions presented through an external input signal 14. For the purposes of the present invention, input signal 14 may be either an analog or digital signal. The source of this signal is unimportant to the present invention. For example, in the preferred embodiment of the present invention, arm 12 serves as a baffle in a ventilation duct which mixes hot and cold air flows. Thus, input signal 14 is produced by a feedback system (not shown) that controls input signal 14 to achieve a desired temperature of the mixed air flow. However, actuator 10 is not limited to this application and may be used whenever an actuator arm needs to be positioned in accordance with instructions presented by an input signal.

Input signal 14 is received by a first input of a controller 16. Controller 16 performs calibration and comparison functions for actuator 10, as discussed below in connection with FIGS. 4-5, and may be implemented using conventional microprocessor and related circuits, including memory circuits 18. As is conventional, memory circuits 18 store programming instructions which define the tasks performed by controller 16 and store data used by controller 16 in carrying out its control functions (discussed below).

Controller 16 has several outputs which control various aspects of actuator 10. A greater than (GT)/less than (LT) output 20 couples to a first control input of a switch 22 and to a direction control input of a commutation counter 24. An unequal output 26 of controller 16 couples to a second control input of switch 22; and, an output 28 of controller 16 couples to a reset input of commutation counter 24. A count output of commutation counter 24 couples to a second input of controller 16.

Switch 22 has first and second input ports which couple to a V+ terminal 30 and a ground terminal 32, respectively. Switch 22 is configured so that when its second control input is inactive, a voltage is applied across output ports 34 and 36 thereof. However, when the second control input is active, substantially no voltage is applied across ports 34-36. In addition, switch 22 is configured so that the voltage polarity applied across ports 34-36 is defined by the first control input of switch 22. Specifically, when output 20 of controller 16 is in a first state, a V+ potential appears at port 36 and a ground potential appears at port 34; and, when output 20 of controller 16 is in a second state, a ground potential appears at port 36 and a V+ potential appears at port 34. Those skilled in the art may implement switch 22 using relays, as suggested by FIG. 1, or by using solid state components.

A DC motor 38 is electrically coupled between ports 34-36. Accordingly, when switch 22 applies a first polarity voltage to motor 38, motor 38 rotates in a first direction, such as clockwise (CW); and, when switch 22 applies a second polarity voltage to motor 38, motor 38 rotates in a second direction, such as counterclockwise (CCW). In addition, a shaft or rotor 40 of motor 38 physically or mechanically couples to an input of a gear reduction box or transmission 42, and an output of gear reduction box 42 couples to arm 12. Accordingly, as motor 38 rotates clockwise, arm 12 rotates in a first direction, and when motor 38 rotates counterclockwise, arm 12 rotates in an opposing direction.

Arm 12 is confined to rotate between first and second extreme positions 44 and 46, respectively. When motor 38 rotates a sufficient number of revolutions, which may be in the hundreds depending on the degree of reduction provided by gear reduction box 42, to cause arm 12 to reach extreme position 44, arm 12 travels no further and motor 38 stalls. Likewise, arm 12 travels no further than extreme position 46, and motor 38 stalls when arm 12 reaches position 46. In the preferred embodiment, switch 22 and motor 38 are selected to tolerate the high currents drawn in a stalled condition for an indefinite period of time. While FIGURE 1 illustrates a rotational motion for arm 12, those skilled in the art will recognize arm 12 may alternatively be configured to achieve linear motion as well.

FIG. 1 schematically illustrates components included within motor 38. Specifically, brushes 48 ride against a commutator 50, which is composed of a plurality of commutator segments 52. As shown in FIG. 1, the preferred embodiment of the present invention utilizes a three pole motor, which has three corresponding commutator segments 52. Commutator segments 52 are physically spaced apart from one another by non-conductive lands or slots 54. One of three sets of windings 56 couples between each combination of two commutator segments 52. As is conventional, current flows through only one of windings 56 at a time. This current produces magnetic forces which cause rotor 40 to rotate. The rotation causes brushes 48 to ride over commutator segments 52 and lands 54. After each land 54 is encountered by a brush 48, motor current is switched, or commutated, to flow through a different one of windings 56.

Accordingly, for each revolution of the three pole motor 38 shown in FIG. 1, six commutatior's result. As shown in trace $A_1$ of FIG. 2, an average current flows through motor 38 when voltage is applied thereto. However, actual current fluctuates as shown in trace $A_2$ of FIG. 2. The fluctuation results from motor commutation and is caused by the open circuits through motor 38 which appear when brushes 48 encounter lands 54 during motor rotation. Of course, those skilled in the art will recognize that trace $A_2$ illustrates a timing diagram which indicates when commutation begins and ends, and that actual current flow into motor 38 may not be as distinctively defined as illustrated in trace $A_2$.

Referring back to FIG. 1, commutation counter 24 couples to motor 38 in such a manner that the commutations of motor 38 may be reliably detected and counted as motor 38 rotates. In particular, commutation counter 24 maintains a commutation count value which reflects the number of rotations motor 38 has experienced since a calibration procedure (discussed below). When motor 38 rotates in one direction, this commutation count is increased, and when motor 38 rotates in the opposing direction, the commutation count is decreased. This commutation count is presented to controller 16 where it is compared with input signal 14. Controller 16 controls GT/LT output 20 so that the proper polarity voltage is applied to motor 38 to cause motor 38 to approach a desired position. When the desired position is reached, controller 16 activates output 26 to remove voltage from motor 38.

FIG. 3 shows a detailed block diagram of commutation counter 24. With reference to FIG. 3, a toroid core current transformer 58 couples to motor 38. Specifically, the conductors which supply current to motor 38 between ports 34 and 36 serve as a primary winding 60 to transformer 58. A secondary winding 62 of transformer 58 couples across positive and negative inputs of a differential amplifier 64. In addition, an optional low pass filter 66 couples to the inputs of amplifier 64.

The preferred embodiment utilizes a toroid core approximately 8–10 mm in diameter and having a relatively high magnetic permeability. Primary winding 60 is wound approximately 10 turns around the core and secondary winding 62 has around 25 turns. The toroid core size and small number of windings result in a transformer which is inexpensive to purchase, manufacture, and install. Moreover, the use of a transformer DC isolates commutation counter 24 from the average DC current flowing in motor 38. Since this average DC current is responsive to motor loading, such current is undesirable for sensing motor position. In addition, the use of a toroid core for transformer 58 causes magnetic fields to be confined within the core and generally unresponsive to external magnetic influences. A reliable sensing technique that is substantially immune to the ravages of time and the environment results.

Amplifier 64 is a conventional operational amplifier which is configured to have a gain of around 100. In draws an average current of around 30–60 ma when operating under normal loading conditions and draws a stalling current of around 300 ma. Motor 38 operates at around 4000 RPM at 14 Vdc under no load conditions so that a maximum of approximately 400 commutations occur each second, or one commutation takes place each 2.5 msec. Under these conditions, sufficient magnetic field is established in transformer 58, induced in secondary winding 62, and amplified in amplifier 64 to produce a voltage waveform similar to that shown in trace $B_1$ of FIG. 2.

Figure 2:
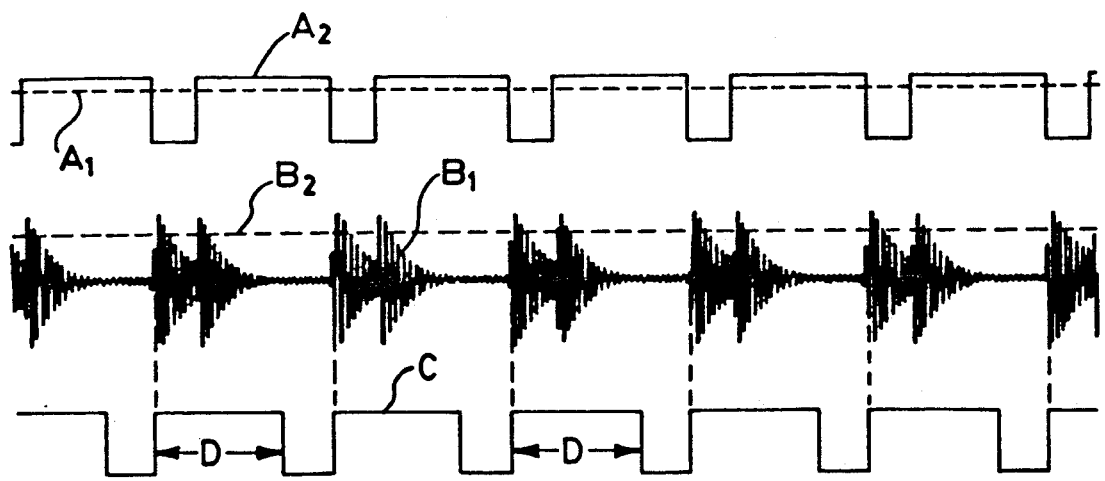
FIG. 2 shows a timing chart of signals which describe the operation of the present invention.

As shown in connection with trace $A_2$ of FIG. 2, trace B includes an AC burst 68 for each commutation of motor 38. Each AC burst exponentially decays to a nominal value prior to a subsequent commutation of motor 38. Trace $B_1$ may begin each single AC burst two times, once for each of a beginning and an end of a commutation. However, due to the noisy nature of current flow within a DC motor, these two AC burst beginnings may form only a single AC burst 68. In other words, an ending-commutation burst happens before a beginning-commutation burst has decayed to a near-nominal value. Nevertheless, even in motor applications where burst 68 is represented by two separate AC bursts, one responding to each of a commutation beginning and a commutation end, the present invention properly counts only one commutation, as discussed below.

In the preferred embodiment, the use of high gain in amplifier 64 causes amplifier 64 to naturally act as a low pass filter with a cutoff point at around 500–800 Hz. Thus, in the preferred embodiment of the present invention, low pass filter 66 is actually incorporated within the design of amplifier 64 and is not a discrete item. This 500–800 Hz cutoff point is sufficiently high to permit AC bursts 68 to achieve a significant amplitude, as shown in FIG. 2. However, this cutoff point is also low enough to significantly attenuate higher frequency noise signals which may result from brush bounce, carbon tracking, motor bearing wear, and the like, and to insure that AC bursts 68 decay significantly before the next commutation even when motor 38 operates at its maximum speed.

Amplifier 64 couples through a DC blocking filter 70, such as a diode or capacitor, to a trigger input of a monostable timing circuit 72. In the preferred embodiment, timing circuit 72 represents a conventional non-retriggerable one-shot circuit which generates a single pulse each time it is triggered. The duration of this pulse remains substantially constant from pulse to pulse and is defined by timing components 74, which couple to timing circuit 72. Since a non-retriggerable circuit configuration is used, any triggering which occurs while the generated pulse is active does not substantially extend pulse width.

Referring to FIGS. 2 and 3 together, trace $B_2$ illustrates a trigger threshold associated with timing circuit 72. As shown in traces $B_1$ and $B_2$, many cycles of AC bursts 68 achieve an amplitude which exceeds this trigger threshold. As illustrated by trace C of FIG. 2, when timing circuit 72 is inactive, as shown by a low level, the first cycle of an AC burst 68 to exceed trigger threshold $B_2$ causes timing circuit 72 to activate. Subsequent triggerings of timing circuit 72 have no effect on the pulse width. Thus, a predetermined duration D after the pulse activates, it deactivates. Predetermined duration D is selected so that the pulse width lasts generally until the triggering AC burst 68 has decayed in amplitude to a nominal value. However, duration D is sufficiently short so that the pulse is inactive prior to a subsequent commutation of motor 38. In the preferred embodiment, duration D is set to approximately 75% of the period between motor commutations when motor 38 operates at its maximum speed. Consequently, timing circuit 72 generates one and only pulse for each commutation of motor 38.

With reference to FIG. 3, the output of timing circuit 72 couples to a clock input of a counter circuit 76. Counter circuit 76 is a conventional digital up/down counter which is configured to include a sufficient number of bits to represent the maximum number of commutations experienced by motor 38 in moving arm 12 from extreme position 44 to extreme position 46 (see FIG. 1), or vice versa. For example, if motor 38 performs 500 revolutions to move arm 12 between extreme position 44 and extreme position 46, and motor 38 experiences 6 commutations per revolution, then counter 76 has sufficient capability to count to over 3000. A reset input of counter 76 couples to output 28 of controller 16. An up/down count control input of counter 76 couples to output 20 of controller 16 (see FIG. 1). Thus, counter 76 increments with each pulse from timing circuit 72 when control output 20 exhibits one state, and decrements with each pulse from timing circuit 72 when control output 20 exhibits the opposing state. Consequently, counter 76 maintains a current count of the position of motor 38.

FIGS. 4 and 5 show flow charts which describe the operation of controller 16 to actuate movement in arm 12. Those skilled in the art will recognize that controller 16 may perform programming instructions stored within memory 18 to carry out this operation. FIG. 4 illustrates a calibration procedure 80, and FIG. 5 illustrates a position arm procedure 90.

Referring to FIGS. 1 and 4, controller 16 performs calibration procedure 80 to synchronize the current count maintained within counter 76 (see FIG. 3) with arm 12. Procedure 80 is preferably performed on a periodic basis, whenever power is applied, or on any other schedule which may be convenient for a specific application. Initially, in a task 81, procedure 80 drives arm 12 in a first direction, such as clockwise. Arm 12 may be driven by deactivating output 26 and appropriately setting output 20 of controller 16. Next, an inquiry task 82 determines whether arm 12 has reached an extreme position, such as position 46. This determination may be performed simply by waiting for a sufficiently long period of time to guarantee that arm 12 has reached extreme position 46. Alternatively, a current sensor (not shown) may be installed to detect a stall current flowing in motor 38 and to report this stall current to controller 16.

Procedure 80 waits at task 82 until task 82 determines that extreme position 46 has been reached. At this point, a task 83 resets counter 76 (see FIG. 3) by temporarily activating output 28 of controller 16. After task 83, a task 84 then drives arm 12 in a second direction, such as counterclockwise. Task 84 reverses the state of output 20 while keeping output 26 deactivated. While motor 38 is operating to move arm 12 counterclockwise, commutation counter 24 is counting commutations experienced by motor 38. After task 84, an inquiry task 85 determines whether arm 12 has reached extreme position 44. Program control remains at task 85 until arm 12 reaches position 44. When extreme position 44 has been reached, a task 86 causes controller 16 to read and save the current count in memory 18.

At this point in procedure 80, the current count represents a maximum count achievable by actuator 10. It may be used later in scaling input signal 14 to the physical constraints imposed on arm 12. However, those skilled in the art will recognize that tasks 84-86 are optional for performance during every calibration of actuator 10. Since physical constraints imposed on arm 12 are often constant over time, once the maximum current count achieved in task 86 is determined for a particular application, this maximum count may not need to be updated.

With reference to FIGS. 1 and 5, position arm procedure 90 is performed after completion of calibration procedure 80 to move arm 12 to a position defined by input signal 14. First, a task 91 gets input signal 14 and converts input signal 14 to a reference count. If input signal 14 is an analog signal, task 91 converts input signal 14 from an analog to a digital signal. Once a the maximum current count discussed above in connection with task 86 (see FIG. 4). The reference count results from this scaling operation. This reference count represents the count that will be reached by commutation counter 24 when arm 12 reaches its desired position.

After task 91, a task 92 reads the current count from commutation counter 24. Of course, those skilled in the art will recognize that task 92 may include other details. For example, the current count may be compensated to account for backlash of gear reduction box 42 and for an initial pulse which results from an initial energization of motor 38. Next, an inquiry task 93 compares the current count obtained in task 92 with the reference count obtained in task 91. If the current count is, for example, greater than the reference count, then a task 94 drives arm 12 in a clockwise direction. If the current count is, for example, less than the reference count, then a task 95 drives arm 12 in a counterclockwise direction. After either of tasks 94 or 95, program control returns to task 92, or optionally task 91, to repeat the comparison process.

Eventually, task 93 will determine that the current count equals the reference count. When this happens, a task 96 stops motor 38 by activating output 26. After task 96, arm 12 is positioned as requested by information presented in input signal 14.

In summary, the present invention provides an improved actuator positioning apparatus and method. The present invention utilizes a conventional and inexpensive DC motor to drive an actuator arm. The present invention senses motor position, which directly relates to actuator position, without using moving parts or parts that must be physically positioned in any particular orientation. Accordingly, reliability and accuracy are improved. Moreover, the present invention senses naturally occurring commutations of current in the DC motor to determine motor position. Accordingly, no physically mounted position-indicating components are required, and a reliable apparatus which is inexpensive to manufacture and maintain results.

The present invention has been described above with reference to a preferred embodiment. However, those skilled in the art will recognize that changes and modifications may be made in this preferred embodiment without departing from the scope of the present invention. For example, the tasks performed by controller 16, described above, may be readily expanded to include the functions performed by counter 76 and timing circuit 72, described above. In addition, controller 16 may be expanded to include additional functions which serve to generate input signal 14. Moreover, controller 16 may be replaced, at least in part, by a conventional comparator circuit. These and other changes and modifications which are obvious to those skilled in the art are intended to be included within the scope of the present invention.

What is claimed is:

1. A method of operating a CD motor to position a member, said method comprising the steps of:
    receiving a position signal defining a desired position for said member;
    applying a DC voltage to said motor, said applying step causing a current to flow through said motor;
    sensing fluctuations in said current, said fluctuations being caused by commutations of said motor;
    activating pulses in response to said current fluctuations;
    for each of said activated pulses, deactivating said pulse a predetermined duration after said pulse is activated, said predetermined duration being determined independently from said current fluctuations;
    counting said pulses to maintain a current count;
    comparing said current count with said position signal; and
    removing said CD voltage from said motor when said comparing step indicates that said member has substantially reached said desired position.

2. A method as claimed in claim 1 additionally comprising, prior to said applying step, the steps of:
    driving said member to a first extreme position; and
    initializing said current count to a predetermined value.

3. A method as claimed in claim 2 additionally comprising, after said initializing step, the steps of:

energizing said motor to drive aid member to a second extreme position, said energizing step causing said current to flow through said motor;

sensing said fluctuations in said current while driving said member to said second extreme position;

adjusting said current count to reflect occurrences of said fluctuations while driving said member between said first and second extreme positions; and recording said current count when said second extreme position is reached, said recorded current count being used to generate said position signal.

4. A method as claimed in claim 1 wherein said sensing step comprises the step of inductively generating second current fluctuations which are responsive to said average current fluctuations, said generating step utilizing a toroid core transformer to substantially confine magnetic fields within said toroid core, and said activating step being responsive to said second current fluctuations.

5. A method as claimed in claim 1 wherein said predetermined duration is less than the period of time that transpires between successive commutations of said motor when said motor operates at a maximum speed for said motor.

6. A method as claimed in claim 5 wherein said deactivating step comprises the step of selecting said predetermined duration so that said predetermined duration is greater than one-half of the time that transpires between successive commutations of said motor when said motor operates at said maximum speed.

7. A method as claimed in claim 1 wherein said applying step comprises the step of polarizing said DC voltage so that said DC voltage exhibits one of first and second polarities, and said counting step comprises the steps of:
   increasing said current count in response to said first polarity; and
   decreasing said current count in response to said second polarity.

8. An actuating apparatus for causing a member to move to a desired position, said apparatus comprising:
   means, having a control input, for selectively applying a DC voltage in response to a signal presented at said control input;
   a DC motor physically coupled to said member and electrically coupled to said selectively applying means so that commutations of said motor occur and a current flows through said motor while said DC voltage is applied;
   means, coupled to said motor, for sensing fluctuations in said current and producing a representative signal corresponding to said fluctuations in said current;
   a pulse generator having an input coupled to said sensing means and having an output, said pulse generator being configured to produce a pulse for each commutation of said motor, each pulse beginning when said representative signal exceeds a predetermined threshold and continuing for a predetermined duration, said predetermined duration being determined independently from said representative signal;
   means, coupled to said pulse generator, for counting said pulses to obtain a current count; and
   feedback means, coupled to said counting means and to said control input of said voltage applying means, for controlling application of said DC voltage in response to said current count.

9. An actuating apparatus as claimed in claim 8 wherein:
   said voltage applying means is configured to apply said DC voltage in one of first and second polarities;
   said counting means additionally couples to at least motor; and
   said counting means is configured to increment said current count in response to application of said first polarity and to decrement said current count in response to application of said second polarity.

10. An actuating apparatus as claimed in claim 8 wherein said sensing means is AC coupled to said motor to isolate said sensing means from said average current.

11. An actuating apparatus ad claimed in claim 8 wherein said sensing means comprises a transformer having a primary winding coupled in series with said motor and said voltage applying means and a secondary winding coupled to said pulse generator.

12. An actuating apparatus as claimed in claim 11 wherein said transformer additionally has a toroid core about which said primary and secondary windings are wrapped, said toroid core being configured to allow said transformer to resist external electromagnetic interference.

13. An actuating apparatus as claimed in claim 11 wherein:
   current fluctuation occurrences of said motor result from said motor commutations, and said commutations occur at a predetermined frequency when said motor operates at a maximum speed for said motor; and 'said sensing means additionally comprises an amplifier having an input coupled to said secondary winding and an output coupled to said pulse generator, said amplifier being configured to attenuate amplified electrical signals exhibiting twice said predetermined frequency relative to amplified electrical signals exhibiting less than said predetermined frequency.

14. An actuating apparatus as claimed in claim 8 wherein said pulse generator is configured so that pulses produced by said pulse generator exhibit durations which are greater than one-half of the time which transpires between successive ones of said commutations of said motor when said motor operates at a maximum speed for said 15. An actuating apparatus as claimed in claim 14 wherein said pulse generator is configured so that:
   said durations of said pulses are substantially equal to one another;
   each of said durations begins with a triggering event; and
   the duration of each pulse is not substantially extendable by re-triggering.

16. An actuating apparatus for fusing a member to move to a desired position, said apparatus comprising:
   means, having a control input, for selectively applying a DC voltage in response to a signal presented at said control input;
   a DC motor physically coupled to said member and electrically coupled to said selectively applying means so that a current flows through said motor while said DC voltage is applied and so that said current fluctuates as a result of motor commutations;
   a transformer having a primary winding coupled in series between said motor and said voltage applying means and having a secondary winding, said primary and secondary windings being wound around a toroid core;

a counter, coupled to said secondary winding, for counting commutations of said motor to obtain a current count; and feedback means, coupled to said counter and to said control input of said voltage applying means, for controlling application of said CD voltage in response to said current count.

17. An actuating apparatus ad claimed in claim 16 wherein:

said voltage applying means is configured to polarize said CD voltage to exhibit one of first and second polarities;

said counter couples to at least one of said feedback means, voltage applying means, and motor; and said counter is configured to increment said current count in response to said first polarity and to decrement said current count in response to said second polarity.

18. An actuating apparatus ad claimed in claim 17 additionally comprising a pulse generator having an input coupled to said secondary winding of said transformer and an output coupled to said counter, said pulse generator being configured to supply a single pulse to said counter for each commutation of said motor, each single pulse beginning when a representative signal proceeded by said secondary winding of said transformer excess a predetermined threshold and continuing for a predetermined duration, said predetermined duration being determined independently from said representative signal.

19. An actuating apparatus as claimed in claim 18 wherein said pulse generator is configured so that pulses produced by said pulse generator exhibit durations which are grater than one-half of the time which transpires between successive ones of said commutations of said motor when said motor operates at a maximum speed for said motor.

20. An actuating apparatus ad claimed in claim 18 wherein said pulse generator is configured so that:

said durations of said pulses are substantially equal to one another;

each of said durations begins with a triggering event; and the duration of each pulse is not substantially extendable by re-triggering.

* * * * *

UNITED STATES PATENT AND TRADEMARK OFFICE
CERTIFICATE OF CORRECTION

PATENT NO. : 5,132,602
DATED : July 21, 1992
INVENTOR(S) : Gary C. Jorgensen, et. al.

It is certified that error appears in the above-indentified patent and that said Letters Patent is hereby corrected as shown below:

```
Column 8, claim 1, line 41, delete "CD" and insert --DC--.
Column 8, claim 1, line 59, delete "CD" and insert --DC--.
Column 9, line 1, delete "aid" and insert --said--.
Column 10, claim 14, line 46, insert --motor-- after "said".
Column 10, claim 16, line 55, delete "fusing" and insert --causing--.
Column 10, claim 9, line 7, before "motor", add --one of said feedback
means, voltage applying means, and--.
Column 11, line 8, delete "CD" and insert --DC--.
Column 11, line 13, claim 17, delete "CD" and insert --DC--.
Column 11 line 21, claim 18, delete "ad" and insert --as--.
Column 12, line 4, delete "proceeded" and insert --produced--.
```

Signed and Sealed this

Seventeenth Day of August, 1993

Attest:

BRUCE LEHMAN

*Attesting Officer*　　　　Commissioner of Patents and Trademarks